United States Patent [19]
Green

[11] 4,025,396
[45] May 24, 1977

[54] METHOD AND SYSTEM FOR FRACTIONATION HEAT BALANCE CONTROL

[75] Inventor: Jarrell T. Green, Mount Prospect, Ill.

[73] Assignee: UOP Inc., Des Plaines, Ill.

[22] Filed: Nov. 28, 1975

[21] Appl. No.: 636,179

[52] U.S. Cl. .............................. 203/2; 203/DIG. 18; 202/160

[51] Int. Cl.² ......................................... B01D 3/42

[58] Field of Search .................. 203/1, 2, DIG. 18; 202/160; 196/132

[56] References Cited

UNITED STATES PATENTS

| | | | |
|---|---|---|---|
| 2,580,651 | 1/1952 | Boyd | 203/2 |
| 2,684,326 | 7/1954 | Boyd | 203/2 |
| 3,272,722 | 9/1966 | Walker | 203/2 |
| 3,408,261 | 10/1968 | Johnson | 203/2 |
| 3,411,308 | 11/1968 | Bellinger | 203/DIG. 18 |
| 3,464,895 | 9/1969 | Boyd | 203/2 |

*Primary Examiner*—Hiram H. Bernstein
*Attorney, Agent, or Firm*—James R. Hoatson, Jr.; Robert W. Erickson; William H. Page, II

[57] ABSTRACT

Heat balance of a fractionation column is controlled and maintained by obtaining three differential temperatures between selected temperature-sensing points along the height of the column. Signals representing the three delta-T's are employed in regulating the quantity of reflux to the rectification zone and the enthalpy (heat-input content) of the reboiled liquid bottoms stream. With respect to the latter, two delta-T's, obtained below the feed locus are used. One of these is considered in conjunction with the third delta-T, obtained above the feed tray, and an additional signal representing the flow rate of the feed stream, to regulate the quantity of reflux.

8 Claims, 1 Drawing Figure

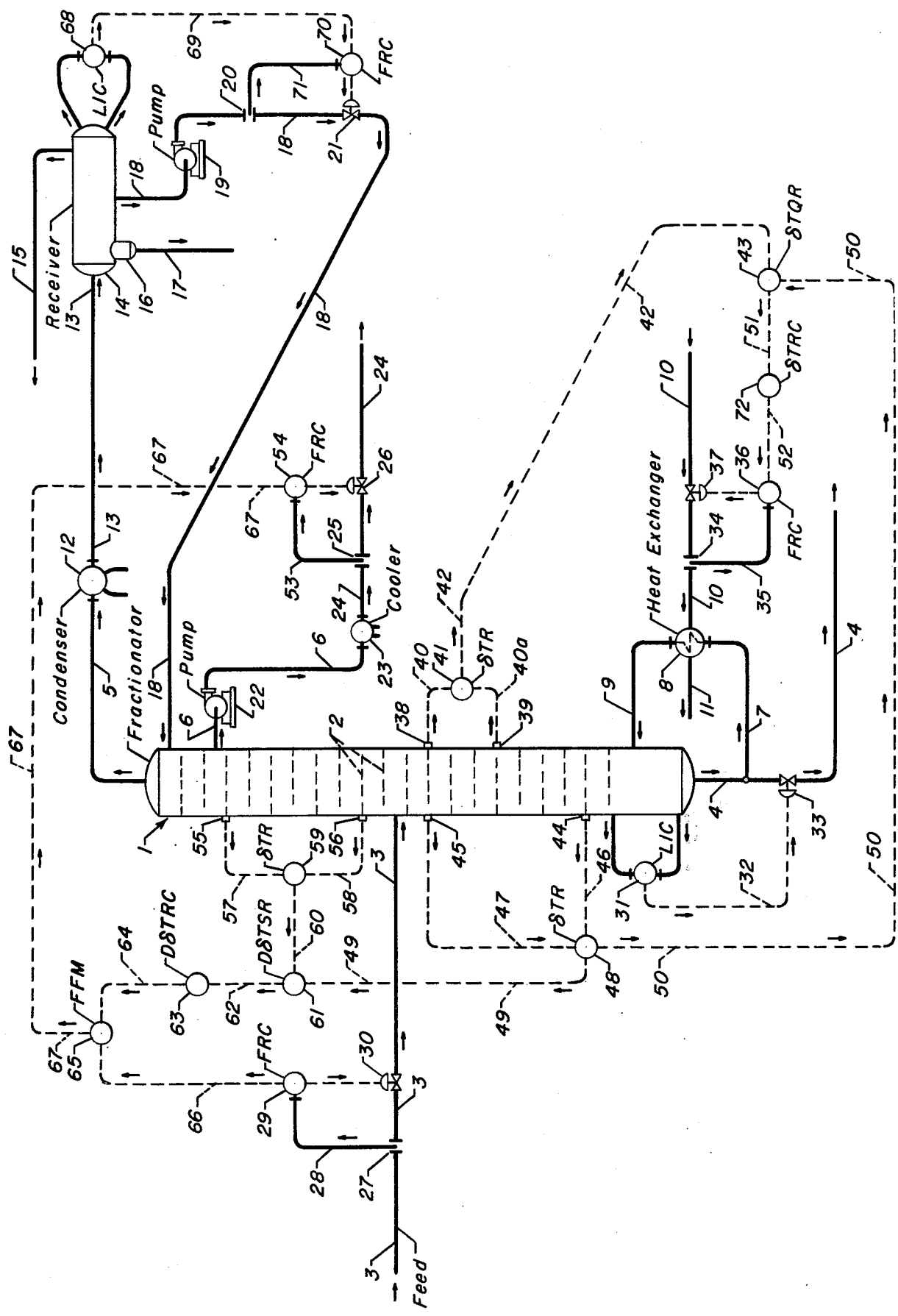

METHOD AND SYSTEM FOR FRACTIONATION HEAT BALANCE CONTROL

APPLICABILITY OF INVENTION

My inventive concept, as herein more fully described, encompasses a control system and method for maintaining the heat balance of a fractionation column functioning to separate a mixed-component feed stream. The system is particularly applicable where the intended product stream is characterized as a substantially pure component -- e.g., the overhead recovery of benzene from a mixture of aromatic hydrocarbons. The fractionation column must be maintained in heat balance in order to obtain the specified product composition, whether a bottoms product, overhead product, sidecut product, or where both bottoms and overhead product compositions are specified. For example, in recovering benzene from a mixture thereof with toluene and the various xylenes, proper heat balance, in conjunction with composition and feed rate-responsive controls, will result in a substantially-pure overhead benzene stream and, simultaneously, minimal benzene in the liquid bottoms product.

In the present specification, as well as the appended claims, the use of the term "fractionation column" synonymously alludes to "rerun column", distillation column", "stripping column," etc. In the usual separation-via-fractionation technique, a mixed, or multi-component feed stream is introduced intermediate the ends of the column, often at about its mid-point. Fractionation columns are vertically disposed cylindrical chambers having a plurality of spaced-apart trays, or decks which provide the necessary intimate mixing of countercurrently flowing liquid and vapors within the column. Heat is supplied to the column through the use of a reboiler heater, or heat-exchanger, communicating with the lower reboiler section. The reboiler section contains an inventory of liquid material, generally maintained by way of a suitable liquid-level controller, and a portion thereof is withdrawn, partially vaporized in the reboiler heater, and returned to the column generally at a point just below the lowermost tray, or deck. Reflux is supplied to the column by cooling and condensing an overhead product stream and returning a portion thereof through a locus above the uppermost tray, or deck. These two streams, the reflux and reboiled bottoms liquid, constitute the two major factors in the heat balance of the column, the remainder being the feed stream introduced and the product streams leaving the column.

Although understood by those skilled in the art of separation by way of fractionation, the definition of several additional terms, as employed herein, is believed to be warranted. The "reboiler section " of a distillation column is that portion below the lowermost tray, or deck, while the "fractionation section" is that portion of the column above the lowermost tray. The "stripping section" includes those trays between the lowermost tray and the feed tray, while the "rectification section" refers to those trays above the feed tray.

Also, as utilized herein, the terms "heat-input" and "heat-input content" of a stream, allude to enthalpy and are intended to connote the quantity of energy, per unit of time, introduced into or removed from the column by a given stream, whether returned to column at a lower temperature (reflux), or at a higher temperature (reboiled liquid). For example, considering the feed stream, at a given composition and temperature, it will have a given enthalpy expressed as BTU/lb. Depending upon its flow rate, expressed as lbs./hr., it will supply a given heat-input to the column expressed as BTU/hr. Any change in temperature, flow rate, or composition will change the enthalpy thereof. Likewise, a change in the flow rate of the reflux stream will affect its contribution of enthalpy. With respect to the reboiled liquid bottoms, returned to the column, its enthalpy contribution may be varied via its flow rate, or the flow rate of the heat-exhange medium employed to partially vaporize it. Although many variables, relevant to the feed stream, reflux stream and returned vaporized bottoms liquid, have an effect upon the thermal balance of the column, perhaps the most pronounced is the effect of the heat-input by way of the reboiler section. This particular source of enthalpy takes two forms: (i) the increased sensible heat of the liquid returned to the reboiler section and, (ii) the latent heat of vaporization contained in the vapors generated in the reboiler heater. Since the latter constitutes the source of greatest quantity of heat-input, it must necessarily be subject to control and/or regulation. Furthermore, since overall separation efficiency is largely dependent upon heat-input to the reboiler section and the flow rate of reflux to the rectification section, any thermal balance control system and method must take into account those loci within the fractionation column where the effects of varied reboiler section heat-input and reflux rates are most pronounced and immediate. The present invention directs itself to such a control system and method, and simultaneously considers the flow rate of the feed stream in order to maintain the reflux/feed ratio.

The present invention is utilized to maintain the specified composition, or a composition characteristic of a product stream withdrawn from one end of a fractionation column, whether the desired product constitutes the overhead stream, the bottoms liquid or both. Distillation techniques are extensively employed throughout the petroleum and petrochemical industries for the separation and recovery of select fractions of the feed stock, or of substantially pure compounds, and the adaptability thereto of the present control system and fractionation method will be recognized by those having the requisite skill in the appropriate art.

OBJECTS AND EMBODIMENTS

A principal object of my invention is to provide an efficient method for fractionating a feed stream having mixed components. A corollary objective is directed toward maintaining a fractionation column in thermal balance consistent with feed stream characteristics.

More specifically, it is an object of the present invention to afford a control system which maintains thermal balance while simultaneously enhancing separation efficiency.

Another object involves providing a control system which immediately counteracts the effect of changes in feed stream flow rate upon the reflux/feed volumetric ratio.

Briefly, these objects are attained by sensing six temperatures at selected points throughout the height of the fractionation column. The six temperatures are segregated into three specific pairs, each of which is employed to measure a temperature differential (delta-T) between two points. The first pair of temperature sensing means are vertically-spaced below the feed locus (or feed tray) and both are proximate thereto, and a signal representative of the delta-T between these points is generated. A second pair of temperature sensors are vertically spaced below the locus of feed introduction; one of the sensors is proximate to the feed locus while the other is proximate to the locus through which the partially vaporized liquid bottoms material is returned to the reboiler section of the column, and a signal representative of the delta-T between these two remote points is generated. These first and second signals are transmitted to a computing means which generates a signal representative of a relationship between the two differential temperatures. The latter signal is utilized to regulate the enthalpy of the reboiler bottoms liquid portion which is partially vaporized and returned to the reboiler section. The third pair of temperature sensors are vertically spaced above the feed locus; one is proximate to the feed locus, while the other is proximate to the locus through which the reflux is returned to the rectification section of the column. Another signal representing the delta-T between these two remote points is considered with the signal representing the temperature differential between the two remote points below the feed tray, and a signal representing the relationship is generated. This last signal is considered with a signal representative of the rate of flow of the feed stream to the column and utilized to regulate the quantity of reflux thereto. As hereinafter indicated, this control system is not found in the appropriate prior art.

One embodiment of my invention, therefore, directs itself to a control system intended for utilization in a fractionation column wherein (i) a feed stream is introduced through a locus intermediate the top and bottom thereof; (ii) liquid bottoms material is recovered from the lower end of said column, and at least a portion thereof is partially vaporized and returned to the reboiler section of said column; and, (iii) overhead material is recovered from the upper end of said column, condensed, and at least a portion thereof returned to the rectification section of said column as a reflux stream, which control system comprises, in cooperative combination: (a) a first pair of vertically spaced temperature sensors below said feed locus and proximate thereto, and a first differential-temperature measuring device connected to said first pair of temperature sensors; (b) a second pair of vertically spaced temperature sensors below said feed locus, one of which is proximate thereto and the second of which is proximate to the locus through which said partially vaporized liquid bottoms material is returned to said reboiler section and, a second differential-temperature measuring device connected to said second pair of temperature sensors; (c) a differential-temperature comparator connected to said first and second differential-temperature measuring devices and co-acting with first control means for regulating the degree to which said liquid bottoms material is vaporized; (d) a third pair of vertically spaced temperature sensors above said feed locus, one of which is proximate thereto and the second of which is proximate to the locus through which said reflux stream is returned, and a third differential-temperature measuring device connected to said third pair of temperature sensors; (e) a double differential-temperature calculating device connected to said second and third differential-temperature measuring devices; (f) second control means for regulating and measuring the rate of flow of said feed stream; and, (g) computing means connected to said double differential-temperature calculating device and to said second control means, and co-acting with third control means for regulating the quantity of said overhead material returned to said column as said reflux stream.

With respect to the techniques employed in recovering an overhead product stream from, and introducing reflux to the rectification section of the fractionation column, my invention is intended to be adapted as hereinbelow stated. First, a single vaporous overhead stream is recovered, at least partially condensed and introduced into a receiver from which a reflux portion is removed on flow control, the remainder being withdrawn as the overhead product by way of liquid-level control within the receiver. Conversely, the overhead product may be recovered on flow control, with the remainder being withdrawn as the reflux portion utilizing liquid level control within the receiver. Another technique involves withdrawing the overhead product as a liquid from a tray below the reflux return locus, on flow control. The vaporous overhead stream is condensed, introduced into the receiver and refluxed in response to a liquid level control therein.

Another embodiment of my invention is specifically directed toward a method for maintaining the heat balance of a fractionation column, wherein (i) a feed stream is introduced through a locus intermediate the top and bottom; (i) a liquid bottoms material is recovered from the lower end, and at least a portion thereof is partially vaporized and returned to the reboiler section; (iii) a vaporous overhead stream is withdrawn from the upper end, condensed, and at least a portion thereof is returned to the rectification section as a reflux stream; and, (iv) a liquid overhead product stream is recovered through a locus below that through which said reflux stream is returned, which method comprises the steps of: (a) sensing a first temperature differential between two vertically spaced temperature-sensing points, both of which are below said feed locus and proximate thereto, measuring said first delta-T and generating a first signal representative thereof; (b) sensing a second temperature differential between two vertically spaced temperature-sensing points below said feed locus, one of which is proximate thereto and the second of which is proximate to the locus through which said partially vaporized liquid bottoms material is returned to said reboiler section, measuring said second delta-T and generating a second signal representative thereof; (c) containing a first computed relationship of said first and second signals, generating a third signal representative of said first relationship and regulating the degree to which said liquid bottoms material is vaporized, in response to said third signal; (e) sensing a third temperature differential between two vertically spaced temperature-sensing points above said feed locus, one of which is proximate thereto, and the second of which is proximate to the locus through which said liquid overhead product stream is recovered, measuring said third delta-T and generating a fourth signal representative thereof; (f) obtaining a second computed relationship of said second and fourth signals and generating a fifth signal representative of said second relationship; (g) measuring the rate of flow of said feed stream and generating a sixth signal representative thereof; (h) comparing said fifth and sixth signals, generating a seventh signal representative of the resulting comparison and regulating the quantity of said liquid overhead stream withdrawn as an overhead product stream in response to said seventh signal; and, (i) regulating the rate of flow of said reflux stream responsive to the rate of flow of said overhead product stream.

Other objects and embodiments, although not specifically delineated herein, will become evident from the following, more detailed description of my invention, and the control system and fractionation technique which it encompasses.

PRIOR ART

Temperature control at some point in a fractionation column, to maintain product composition at that point, in conjunction with the regulation of the enthalpy (heat-input) of a stream introduced into the column, must be acknowledged as old in the art of separation via distillation. Generally, either the flow rate of the reflux stream, or the enthalpy of the partially vaporized liquid bottoms material is regulated. The enthalpy of the feed stream is seldom subject to direct control. Similarly, candor compels recognition of the fact that the published literature is replete with a myriad of techniques designed to afford some measure of control over some aspect of product separation in a fractionation zone. In view of the voluminous nature thereof, no attempt will be made herein to delineate exhaustively the appropriate prior art; a few typical illustrations will suffice. One prior art technique, now since improved upon, involves instituting an energy balance around the reboiler heater; a similar scheme computes the energy balance around the reboiler section of the column. While affording a measure of control, both techniques entail many measurements accompanied by a complex energy balance, and nonetheless are comparatively imprecise. Other techniques involve controlling the flow of fuel medium to the reboiler heater in response either to the temperature of the heated material returned to the reboiler section, or to the rate of mixed-phase flow. For the latter method, the quantity of liquid reboiler bottoms material introduced into the reboiler heater must be pre-set by way of flow control means. Flow control of the heated material re-entering the reboiler section suffers from the disability of not being capable of precisely measuring vapor flow, and depends upon a constant flow rate to the heater.

Another prior art technique involves temperature measurement and control at the point from which the desired product stream is withdrawn, accompanied by regulation of either the heat-input at that point, or at some remote point. To illustrate, if the overhead product is specified as to some composition characteristic, the temperature at some proximate point is sensed and controlled either by regulating the heat-input to the reboiler section, or by adjusting the quantity of reflux to the rectification zone of the column.

Such basic techniques have since been improved upon as illustrated, for example by the double differential-temperature control system found in U.S. Pat. No. 2,580,651 (Cl. 203-2), issued Jan. 1, 1952. Here, the overhead product composition is specified and the temperature gradient within the column is monitored around the feed locus. A first delta-T is measured by two vertically spaced temperature sensors above the feed locus, both of which are proximate thereto. A second delta-T is measured through the use of two vertically spaced temperature sensors below the feed locus, again both of which are proximate thereto. Appropriate signals are transmitted to computing (summing) means which develops a signal representing the difference between the two delta-T's. This last signal is employed to adjust the heat-input to the reboiler section. Also disclosed is the fact that the reboiler section heat-input could be pre-set and the signal from the summing means utilized to control the quantity of reflux to the rectification zone of the column. It is noteworthy that no measurements of the temperatures proximate to the point of immediate effect of the variable being adjusted, or proximate to the locus of the desired product withdrawal, are employed.

In U.S. Pat. No. 2,684,326 (Cl. 203-2), issued July 20, 1954, a similar technique is disclosed, wherein two delta-T's are measured, one above and one below the feed locus. Again, all four temperature sensors are located proximate to the feed locus and are used to control the heat distribution at both ends of the column. In one embodiment, the double differential-temperature signal controls the reflux rate, while a single differential-temperature signal (from below the feed locus) controls the reboiler section heat-input. Alternatively, the single differential-temperature signal (from above the feed locus) regulates the reflux rate, whereas the double differential-temperature signal adjusts the heat-input to the reboiler section. There is no indication, as above stated, of using differential measurements based upon temperatures sensed at the locus of effect of the adjusted variable, or at a locus proximate to the point of desired product withdrawal.

More recently, U.S. Pat. No. 3,464,895 (Cl. 203-2), issued Sept. 2, 1969, describes a differential-temperature control technique founded upon sensing six temperatures within the fractionation column. The specified product is an overhead stream, and one pair of vertically spaced temperature sensors measures the differential temperature within the rectification zone, between two points, one of which is immediately below the locus through which the reflux is returned, and the second of which is about five trays below the reflux locus. The signal representing the resulting temperature differential is utilized to adjust the quantity of reflux returned to the column from the overhead receiver. All of the remaining four temperature sensors are situated below the feed tray, and are ultimately used to provide an output signal which regulates the heat-input to the reboiler section. In accordance with the disclosed technique, the feed locus is immediately above tray 24 (out of 48 which are disposed in the column), and one pair of sensors is located at trays 25 and 28, providing a first delta-T; the second pair of temperature sensors are situated at trays 25 and 40, and provide a second delta-T which, in effect, brackets the first delta-T. The appropriate signals are transmitted to a computing relay which develops a signal representative of the quotient of the first delta-T divided by the second delta-T. This signal is utilized to adjust the heat-input to the reboiler section of the column. It should be noted that no temperature either below or at the feed locus is considered in regulating the reflux rate. Furthermore, any effect which varying reflux rate induces with respect to temperatures proximate to the feed locus is only considered when subsequently adjusting the heat-input to the reboiler section.

Shortcomings of the prior art fractionation control systems, exemplified by U.S. Pat. Nos. 2,580,651 and 2,684,326, are clearly overcome through the utilization of the present invention, wherein the effect of feed stream enthalpy change, whether resulting from varying temperature, composition, flow rate, or a combination thereof, upon the temperatures and compositions below the feed tray is considered when regulating both reflux rate and reboiler section heat-input. Additionally, the immediate effect of heat-input to the reboiler section is cojointly considered with enthalpy changes of the feed stream and regulation of the reflux rate.

The control system herein described also differs materially from that disclosed in U.S. Pat. No. 3,464,895 which employs a single differential-temperature signal to control the reflux rate and a bracketed double differential-temperature system to regulate heat-input to the reboiler section. Here also, no stripping section temperature, much less one proximate to the locus of heat-input to the reboiler section is considered when regulating the reflux flow rate.

Furthermore, none of these illustrated prior art schemes recognize the importance of maintaining a proper reflux/feed ratio necessary in any fractionation technique. In accordance with the present invention, the flow rate of the feed is monitored, an output signal representative thereof is generated and immediately considered in regulating the reflux rate, either directly, or indirectly by regulating the rate at which the overhead product stream is withdrawn.

SUMMARY OF INVENTION

The principle that the temperature of a boiling mixture at a constant pressure is a direct function of its composition underlies control systems intended for use in conjunction with fractionation facilities. In basic form, a temperature at a selected point in the distillation column is controlled to maintain constant composition of the material at that point. Generally, the selected temperature control point is located above the feed tray if it is desired to maintain the overhead product composition, and below the feed tray if the specified composition characteristic is directed toward the bottoms product. In certain circumstances, however, the selected locus of the temperature control point inherently gives rise to a tradeoff between the sensitivity of control and response time of the system. For enhancement of control sensitivity, the temperature control point should be such that a relatively minor variation in product composition corresponds to a comparatively large temperature change at the control point. Conversely, to minimize the system's response time (lag time), the temperature control point should be close to the locus of immediate effect of the variable which is to be regulated. For example, if the reflux flow rate is to be adjusted by the temperature controller, it is preferable to locate the temperature sensing point in the upper section of the column, whereas, if the heat-input to the reboiler section is the regulated variable, the temperature sensing point should be a locus in the lower section of the column.

Certainly, the differential-temperature control systems, hereinbefore set forth, have done much to improve upon the basic technique outlined above, and have improved separation efficiency while improving the relationship between response time and control sensitivity. The control system and method of the present invention offers additional improvement with respect to sensitivity of control and response time, and further improves upon efficiency of separation. This results not only from the selected locations for the various temperature-sensing points, of which there are six, resulting in three delta-T's, but also from considering the feed stream flow rate in conjunction with a double differential-temperature gradient to control, or regulate the reflux rate. The fractionation column is, therefore, maintained under the proper reflux to feed volumetric ratio, and the flow rate of the feed stream is directly considered in controlling the thermal balance of the column.

As hereinbefore stated, there are two major factors in the heat balance of a fractionation column. These are the overhead reflux and the partially vaporized liquid bottoms material returned to the reboiler section of the column. Of these, the major heat source is the partially vaporized bottoms material, generally considered to be the driving force behind the distillation operation. Control of this important variable is, therefore, essential to any successful control system. In accordance with the present method of maintaining a fractionation column in thermal balance, the heat-input, on enthalpy of this stream is regulated by sensing two temperature gradients, or differential temperatures below the feed locus. A first pair of temperature sensors is located proximate to the feed, and are vertically spaced with one or more trays between. Of the second pair of temperature sensors, also both below the feed tray, one is proximate to the feed tray while the second is proximate to the locus through which the partially vaporized bottoms material is returned to the reboiler section of the column. Signals representative of the two resulting delta-T's, are introduced into computing means which develops a signal representing a computed relationship thereof. Preferably, the computed relationship is the quotient of the first delta-T divided by the second delta-T. This computed signal is employed to control and/or regulate the degree to which the liquid bottoms material is vaporized. This differential-temperature system reacts immediately to the effect of a change in feed stream enthalpy as well as any change in the liquid material downwardly flowing from the rectification section into the stripping section of the column. Also, since one of the temperature sensors is proximate to the locus through which the vaporized bottoms material is returned, the effect thereof, coupled with the effect which the feed stream induces, is immediately considered by the delta-T system. The resulting adjustment of heat-input to the reboiler section is also virtually immediate, as contrasted to the relatively longer response time experienced if the adjustment is delayed until the enthalpy change effect immediately below the feed tray exerts an influence in, or proximate to the reboiler section.

Enthalpy changes of the feed stream, either independently or combined with the effect resulting from varying the heat-input to the reboiler, necessarily affect the operation of the rectification section of the column. Therefore, the present control system provides two vertically disposed temperature sensors above the feed locus, one of which is proximate thereto, and the second of which is proximate to the locus through which the eflux stream is returned to the rectification section. These sense a third differential temperature across virtually the entire rectification section. The representative signal of the third delta-T and that of the second delta-T (between the remote points in the stripping section) are transmitted to a second computing means which develops a signal representing a computed relation thereof — preferably one which is indicative of the difference between the second and third delta-T's. This latter signal and one which is representative of the feed stream flow rate are transmitted to a computing means. The output signal from this computing means is utilized in regulating the quantity of overhead material which is returned to the column as a reflux stream.

As stated in the above synopsis, my invention is readily adaptable for integration with three of the more common techniques for conducting fractionation-type separation. Two of these involve initially withdrawing a single overhead vaporous stream which is condensed and introduced into an overhead receiver. In one technique, the reflux therefrom to the rectification zone is on some form of flow control, while the overhead product stream is recovered responsive to changes in the liquid level within the receiver. The second technique is the reverse; that is, the rate of product withdrawal is on flow control which causes the receiver level to fluctuate and thus affect the rate at which reflux is returned. In the third system, the overhead product stream is withdrawn as a liquid from a tray below the reflux locus, the quantity thereof being regulated in accordance with some form of flow control. Overhead vapors are separately recovered, obviously through a locus above the reflux, condensed, introduced into the overhead receiver and returned as reflux in response to the level of liquid in the receiver. In all three techniques, the quantity of reflux is regulated, either directly, or indirectly when the product withdrawal rate is regulated directly.

BRIEF DESCRIPTION OF DRAWING

In further describing the present control system and its method of operation, reference will be made to the accompanying drawing. It is understood that the drawing is presented solely for illustration purposes, and is not intended to be construed as limiting upon the scope and spirit of my invention as defined by the appended claims. Miscellaneous appurtenances, not required for a clear understanding of the inventive concept, have been eliminated, or reduced in number. Such items are well within the purview of one having the requisite skill in the art. Presented in the drawing is a fractionating column 1 containing a plurality of spaced-apart perforated trays 2, and having a feed conduit 3, a bottoms product conduit 4, an overhead vaporous material conduit 5, a side-cut product conduit 6 and a reflux return conduit 18.

DETAILED DESCRIPTION OF DRAWING

Referring now to the drawing, fractionator 1 is shown as having a plurality of spaced-apart trays, or decks 2. In this illustration, the feed stream introduced through line 3 is a mixture of benzene, toluene and the xylenes, with the intended separation being the recovery of a substantially pure benzene overhead product while simultaneously recovering a bottoms product which is substantially benzene-free. The bottoms product is withdrawn, via line 4, in response to liquid level control within the reboiler section of column 1. The overhead product is withdrawn as a liquid, in this illustration, from a tray near the top of the column which is below the top tray thereof, through line 6, while vaporous overhead material exits through line 5. This technique illustrates the third previously described, and is utilized in aromatic hydrocarbon separations in order to recover a substantially dry product which is free from traces of lighter material.

A portion of the liquid bottoms material in line 4 is diverted through line 7 and introduced into a direct-fired heater, or heat-exchanger 8, wherein it is partially vaporized, prior to being returned to column 1 via conduit 9. The heat-exchange medium, which may be steam, hot oil, or a hotter internal process stream, is introduced by way of line 10, and exits from heat-exchanger 8 through line 11. Vaporous overhead material in line 5 is introduced thereby into condenser 12, wherein it is at least partially condensed, and transferred via line 13 into overhead receiver 14. Lighter, non-condensible material is vented through line 15, and any water is removed through dip-leg 16 by way of line 17. Reflux is returned to column 1 via line 18, at a locus above the uppermost, or first perforated tray, or deck, through the use of pump 19. The reflux flow rate through conduit 18 is measured by metering means (an orifice plate) 20 and conduit 71, and compared to the rate required by the automatically adjustable setpoint of Flow Recorder Controller 70. An appropriate signal is transmitted to control valve 21, and the opening thereof is adjusted in response thereto. The amount of reflux, in the present illustration, is regulated by monitoring the liquid hydrocarbon level in overhead receiver 14 through the use of a Level Indicating Controller (LIC) 68. A signal representative of the liquid level is transmitted from LIC 68, via instrument line 69, to Flow Recorder Controller 70, and re-sets the adjustable setpoint thereof.

The heat-input, or enthalpy of the reboiled bottoms, returned through line 9, is controlled by monitoring the rate of steam, or other heating medium in line 10. FRC 36, also having an adjustable setpoint, receives an indication of the flow rate via conduit 35 from orifice meter 34. This is compared to the setpoint setting of FRC 36, a signal is transmitted to control valve 37 and the flow rate in conduit 10 is adjusted in response thereto.

The overhead product stream is withdrawn as a liquid from a perforated tray below the reflux stream locus, through line 6, and introduced therethrough via pump 22, into cooler 23. Cooled product is discharged through conduit 24, and ultimately recovered therefrom. The flow rate of benzene product in line 24 is controlled by FRC 54 communicating, via conduit 53, with orifice meter 25. The indicated flow rate is compared to that called for by the adjustable setpoint of FRC 54, and a signal is transmitted to control valve 26, the opening of which is adjusted in response thereto.

The flow rate of the feed stream in conduit 3 is sensed by orifice meter 27 and line 28, and compared to that required by the control point of FRC 29. An appropriate signal is transmitted to control valve 30, and the opening thereof is accordingly adjusted. Since the quantity of aromatics available as the feed stream to fractionator 1 is dependent upon upstream operations, the adjustable setpoint of FRC 29 will be re-set either in response to some external signal, or manually. The quantity of bottoms product being recovered in line 4 is determined by the level of liquid in the reboiler section as sensed by LIC 31; an output signal is transmitted via instrument line 32 to adjust the opening of control valve 33.

Enthalpy changes of the feed stream in line 3, whether resulting from varied flow rate, temperature, compositon, or any combination of these, induces changes in the temperature gradient below the feed tray. Such effects are sensed by temperature sensors 38, 39, 44 and 45, all of which are located below the feed tray. The first two sensors, 38 and 39, are both proximate to the feed tray, and are vertically spaced-apart to sense the differential temperature, or temperature gradient at loci of the immediate effect of the feed stream changes. The temperature sensors communicate, via instrument lines 40 and 40a, with Differential Temperature Recorder (dTR) 41 which generates a signal representing the differential temperature and transmits this signal, by way of line 42 to Differential Temperature Quotient Relay (dTQR) 43.

The second two temperature sensors, 44 and 45, are also vertically spaced below the feed tray; as shown in the drawing, sensor 45 is proximate to the feed tray, while sensor 44 is proximate to the locus through which the partially vaporized reboiler liquid is returned. Although sensor 45 is shown as sensing the same tray temperature as sensor 38, this is neither essential, nor critical, but is preferred. Temperature sensor 44 is located above the lowermost tray, or deck, and not within the reboiler section itself. Therefore, it senses any temperature change resulting from the greater source of heat-input, that of the latent heat of vaporization. The temperatures sensed by sensors 44 and 45 are representative of the temperature differential, or gradient across virtually the entire stripping section, and transmit appropriate signals via instrument lines 46 and 47 to Differential Temperature Recorder (dTR) 48 which transmits a delta-T signal via line 50 to dTQR 43. The latter generates a signal representing the quotient of the smaller delta-T (line 42) divided by the larger delta-T (line 50), and transmits this signal by way of line 51 to Differential Temperature Recorder Controller (dTRC) 72. A comparison is made with the control point setting of dTRC 72, and a signal is transmitted via instrument line 52 to FRC 36, the setpoint of which is adjusted accordingly; a signal representing any difference between the flow rate of the heating medium in line 10 and the adjusted setpoint is transmitted to control valve 37. In this fashion, the enthalpy of the partially vaporized reboiler bottoms liquid return is virtually immediately adjusted responsive to the varied temperature differential comparison proximate to the feed locus and across the entire stripping section, altering the heat input to compensate for a change in the feed stream enthalpy. The quotient of the smaller delta-T divided by the larger delta-T is preferred to either the sum or difference thereof, since it facilitates the accurate control of the slope of the distillation curve below the feed tray. In adjusting the heat-input to the column via the reboiler section, it should be noted that the final adjustment signal, from dTRC 72, considers the immediate effect of the adjustment in conjunction with the enthalpy change of the feed stream.

The third pair of temperature sensors is vertically-spaced above the feed tray. One of these, 56, is proximate thereto, and the second, 55, is proximate to the locus through which the overhead liquid product is withdrawn via line 6. Sensor 55 is located below the reflux return locus and also preferably below the locus of withdrawal of the liquid product. Sensors 55 and 56 communicate, by way of instrument lines 57 and 58, with dTR 59, which generates and transmits a differential-temperature signal, via line 60, to Double Differential Temperature Summing Relay 61. Also introduced into DdTSR 61, by way of line 49, is the signal representing the delta-T between sensors 44 and 45. The summing relay computes the difference between the two delta-T's and transmits an appropriate signal to DdTRC 63 by way of instrument line 62. DdTRC 63 communicates with Feed Forward Modulator 65 via line 64. The latter also receives a signal representing the feed stream flow rate in line 3, from FRC 29, by way of instrument line 66. FFM 65 is, in effect, a computing means which modulates the reflux-to-feed ratio in response to both the feed rate and the compositon profile as sensed by the double delta-T signal in line 64. A representative signal is transmitted via line 67 to FRC 54, through which the appropriate adjustment is made in the opening of control valve 26, thereby regulating the rate of product withdrawal through conduit 24.

Since the quantity of liquid product being removed through line 24 influences the amount of overhead vaporous material being withdrawn through line 5, regulating the former has the effect of adjusting the quantity of reflux introduced into the column by way of line 18. It will be noticed that the particular locations of temperature sensors 55, 56, 45 and 44, in accordance with the present invention, afford virtually immediate regulation of the reflux rate in response to changes in heat-input to the reboiler section, feed stream enthalpy, both above and below the feed tray, the reflux rate itself and the feed stream flow rate, since such locations are proximate to the immediate effects of these changes. The reflux rate is adjusted in response to temperature gradients resulting from a compositon profile across virtually the entire column, and in accordance with the feed stream flow rate to maintain the proper reflux-to-feed ratio.

The foregoing clearly illustrates the present control system for maintaining product quality and thermal balance within a fractionation column, and the method by which it is utilized. The advantages attendant the selected location of the six temperature sensors, as well as the pairing thereof to obtain three temperature differentials, will become apparent to those having the requisite skill in the art.

I claim as my invention:

1. In a fractionation column wherein (i) a feed stream is introduced through a locus intermediate the top and bottom thereof; (ii) liquid bottoms material is recovered from the lower end of said column, and at least a portion thereof is partially vaporized and returned to the reboiler section of said column; and, (iii) overhead material is recovered from the upper end of said column, condensed and at least a portion thereof returned to the rectification section of said column as a reflux stream, the control system which comprises, in cooperative combination:

a. a first pair of vertically spaced temperature sensors below said feed locus and proximate thereto, and a first differential-temperature measuring device connected to said first pair of temperature sensors;

b. a second pair of vertically spaced temperature sensors below said feed locus, one of which is proximate thereto and the second of which is proximate to the locus through which said partially vaporized liquid bottoms material is returned to said reboiler section and, a second differential-temperature measuring device connected to said second pair of temperature sensors;

c. a differential-temperature computing device connected to said first and second differential-temperature measuring devices and co-acting with first control means for regulating the degree to which said liquid bottoms material is vaporized;

d. a third pair of vertically spaced temperature sensors above said feed locus, one of which is proximate thereto and the second of which is proximate to the locus through which said reflux stream is returned, and a third differential-temperature measuring device connected to said third pair of temperature sensors;

e. a double differential-temperature summing device connected to said second and third differential-temperature measuring devices;

f. second control means for regulating and measuring the rate of flow of said feed stream; and, g. computing means connected to said double differential-temperature summing device and to said second control means, and co-acting with third control means for regulating the quantity of overhead product removed from said column and thereby the quantity of overhead material returned to said column as said reflux stream.

2. The control system of claim 1 further characterized in that said third control means directly regulates the quantity of reflux returned to the rectification zone and fourth control means regulates the quantity of said overhead material removed from said column as an overhead product stream.

3. The control system of claim 1 further characterized in that said third control means directly regulates the quantity of overhead material removed from said column as an overhead product stream, and fourth control means regulates the quantity of overhead material returned to said rectification zone as said reflux stream.

4. In a fractionating column wherein (i) a feed stream is introduced through a locus intermediate the top and bottom thereof; (ii) liquid bottoms material is recovered from the lower end of said column, and at least a portion thereof is partially vaporized and returned to the reboiler section of said column; (iii) a vaporous overhead stream is withdrawn from the upper end of said column, is at least partially condensed and returned to the rectification section of said column as a reflux stream; and, (iv) a liquid overhead stream is withdrawn from said column, as an overhead product stream, through a locus below that through which said reflux stream is returned, the control system which comprises, in cooperative combination:

a. a first pair of vertically spaced temperature sensors below said feed locus and proximate thereto, and a first differential-temperature measuring device connected to said first pair of temperature sensors;

b. a second pair of vertically spaced temperature sensors below said feed locus, one of which is proximate thereto and the second of which is proximate to the locus through which said partially vaporized liquid bottoms material is returned to said reboiler section, and a second differential-temperature measuring device connected to said second pair of temperature sensors;

c. a differential-temperature computing device connected to said first and second differential-temperature measuring devices and co-acting with first control means for regulating the degree to which said liquid bottoms material is vaporized;

d. a third pair of vertically spaced temperature sensors above said feed locus, one of which is proximate thereto and the second of which is proximate to the locus through which said liquid overhead stream is withdrawn, and a third differential-temperature measuring device connected to said third pair of temperature sensors;

e. a double differential-temperature summing device connected to said second and third differential temperature measuring devices;

f. second control means for regulating and measuring the rate of flow of said feed stream;

g. computing means connected to said double differential-temperature summing device and to said second control means, and co-acting with third control means for regulating the quantity of said liquid overhead stream withdrawn as an overhead product stream; and, h. fourth control means for regulating the quantity of said overhead vaporous material returned to said column as said reflux stream.

5. A method for maintaining the heat balance of a fractionation column, wherein (i) a feed stream is introduced through a locus intermediate the top and bottom; (ii) a liquid bottoms material is recovered from the lower end, and at least a portion thereof is partially vaporized and returned to the reboiler section; (iii) a vaporous overhead stream is withdrawn from the upper end, condensed and at least a portion thereof is returned to the rectification section as a reflux stream; and, (iv) a liquid overhead product stream is recovered through a locus below that through which said reflux stream is returned, which method comprises the steps of:

a. sensing a first temperature differential between two vertically spaced, temperature-sensing points, both of which are below said feed locus and proximate thereto, measuring said first delta-T and generating a first signal representative thereof;

b. sensing a second temperature differential between two vertically spaced, temperature-sensing points below said feed locus, one of which is proximate thereto and the second of which is proximate to the locus through which said partially vaporized liquid bottoms material is returned to said reboiler section, measuring said second delta-T and generating a second signal representative thereof;

c. obtaining a first computed relationship of said first and second signals, generating a third output signal representative of said first relationship and regulating the degree to which said liquid bottoms material is vaporized, in response to said third signal;

d. sensing a third temperature differential between two vertically spaced, temperature-sensing points above said feed locus, one of which is proximate thereto, and the second of which is proximate to the locus through which said liquid overhead product stream is recovered, measuring said third delta-T and generating a fourth signal repesentative thereof;

e. obtaining a second computed relationship of said second and fourth signals, and generating a fifth signal representative of said second relationship;

f. measuring the rate of flow of said feed stream and generating a sixth signal representative thereof;

g. comparing said fifth and sixth signals, generating a seventh signal representative of the resulting comparison and regulating the quantity of said liquid overhead stream withdrawn as an overhead product stream, in response to said seventh signal; and, h. regulating the rate of flow of said reflux stream responsive to the rate of flow of said overhead product stream.

6. The method of claim 5 further characterized in that the second temperature-sensing point of said third temperature differential is proximate to, and below the locus through which said overhead product stream is recovered.

7. The method of claim 5 further characterized in that said third signal is representative of the quotient of said first delta-T divided by said second delta-T.

8. The method of claim 5 further characterized in that said fifth signal is repesentative of the difference between said second and third delta-T's.

* * * * *